(12) United States Patent
Franc

(10) Patent No.: US 9,359,000 B2
(45) Date of Patent: Jun. 7, 2016

(54) TELESCOPIC CONNECTING STEERING ROD

(71) Applicant: ZLKL, s.r.o., Loštice (CZ)

(72) Inventor: Josef Franc, Ústí nad Orlicí (CZ)

(73) Assignee: ELBEE MOBILITY S.R.O., Okres Sumperk (CZ)

( * ) Notice: Subject to any disclaimer, the term of this patent is extended or adjusted under 35 U.S.C. 154(b) by 0 days.

(21) Appl. No.: 14/661,761

(22) Filed: Mar. 18, 2015

(65) Prior Publication Data

US 2015/0266498 A1 Sep. 24, 2015

(30) Foreign Application Priority Data

Mar. 19, 2014 (CZ) .................................... 2014-164

(51) Int. Cl.
| | |
|---|---|
| *B62D 1/183* | (2006.01) |
| *B62D 1/185* | (2006.01) |
| *B62D 1/16* | (2006.01) |
| *B62D 1/187* | (2006.01) |

(52) U.S. Cl.
CPC ........ *B62D 1/183* (2013.01); *B62D 1/16* (2013.01); *B62D 1/185* (2013.01); *B62D 1/187* (2013.01)

(58) Field of Classification Search
CPC .......... B62D 1/187; B62D 1/16; B62D 1/185; B62D 1/183
See application file for complete search history.

(56) References Cited

U.S. PATENT DOCUMENTS

| | | | |
|---|---|---|---|
| 4,384,861 A | 5/1983 | Lange et al. | |
| 4,572,023 A | 2/1986 | Euler | |
| 5,332,260 A | 7/1994 | Heinrichs et al. | |
| 5,722,300 A * | 3/1998 | Burkhard | B62D 1/185 280/775 |
| 6,035,740 A | 3/2000 | Budaker et al. | |
| 7,290,800 B2 * | 11/2007 | Schwarzbich | B62D 1/185 280/775 |
| 7,726,691 B2 * | 6/2010 | Yamada | B62D 1/184 280/775 |
| 7,975,569 B2 * | 7/2011 | Klos | B62D 1/185 280/777 |
| 8,955,407 B2 * | 2/2015 | Sakuma | B62D 1/185 280/777 |
| 8,967,017 B2 * | 3/2015 | Osawa | B62D 1/184 280/775 |
| 2005/0070365 A1 * | 3/2005 | Riefe | F16C 3/035 464/162 |
| 2006/0202463 A1 | 9/2006 | Schwarzbich et al. | |
| 2010/0130293 A1 * | 5/2010 | Eriksson | B62D 1/16 464/167 |
| 2011/0005346 A1 | 1/2011 | Kwon | |
| 2015/0210309 A1 * | 7/2015 | Kurokawa | B62D 1/16 464/181 |

FOREIGN PATENT DOCUMENTS

| | | |
|---|---|---|
| CN | 201932226 U | 8/2011 |
| EP | 0179711 A1 | 4/1986 |
| FR | 2987089 A1 * | 8/2013 ............. F16D 3/387 |

(Continued)

*Primary Examiner* — Faye M Fleming
(74) *Attorney, Agent, or Firm* — Buchanan Ingersoll & Rooney PC

(57) ABSTRACT

The telescopic connecting steering rod includes a mutually telescopically arranged main steering rod, a middle adaptor, and an upper extension. A lower end of the main steering rod is adapted to enable its mounting in a vehicle steering system. An upper extension is fitted with a connecting element adapted to connect the steering rod to the tailgate part of the vehicle and to connect it to the control element of the vehicle steering mechanism. An above-open bushing on the upper end of the main steering rod and a connecting element include a head. The outline shape of the head conforms to the inner hollow of the bushing. Both of these mutually insertable parts are fitted with fittings to connect the main steering rod and the connecting element with zero lash.

4 Claims, 4 Drawing Sheets

(56) References Cited

FOREIGN PATENT DOCUMENTS

| GB | 1126071 | A | 9/1968 |
| JP | 2009107557 | A | 5/2009 |
| JP | 2010120558 | A | 6/2010 |
| WO | WO 2012/060744 | A1 | 5/2012 |

* cited by examiner

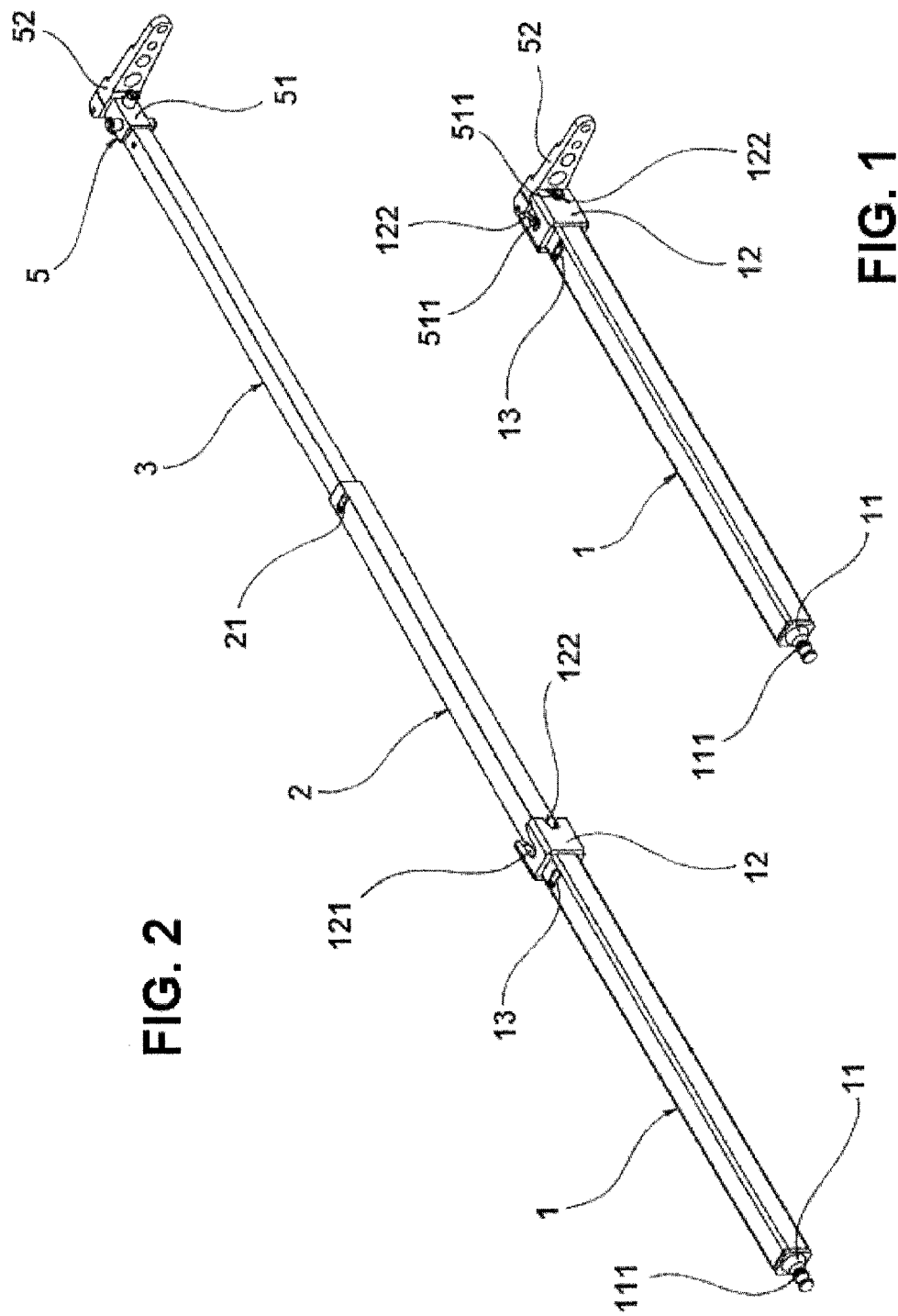

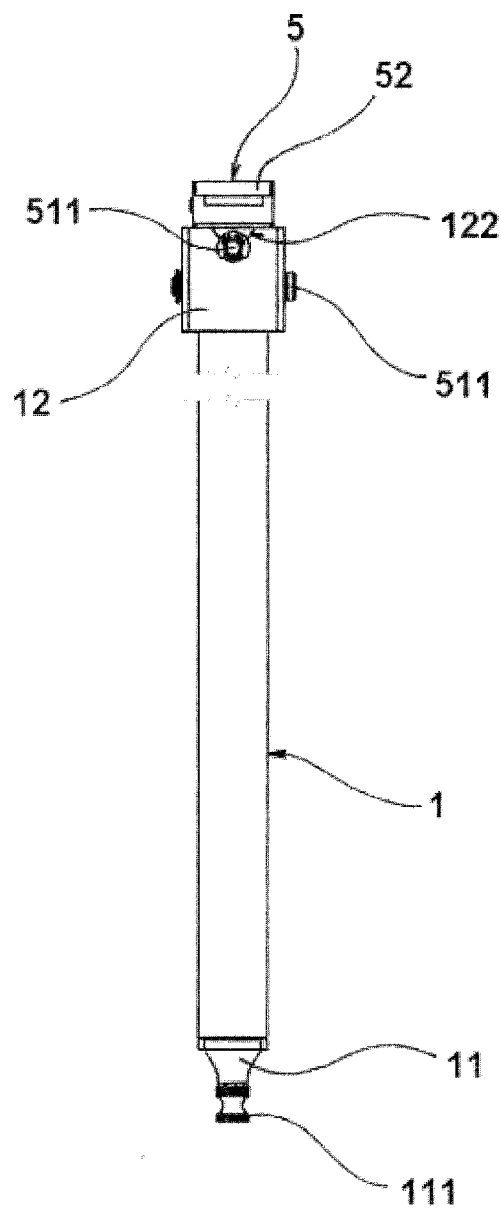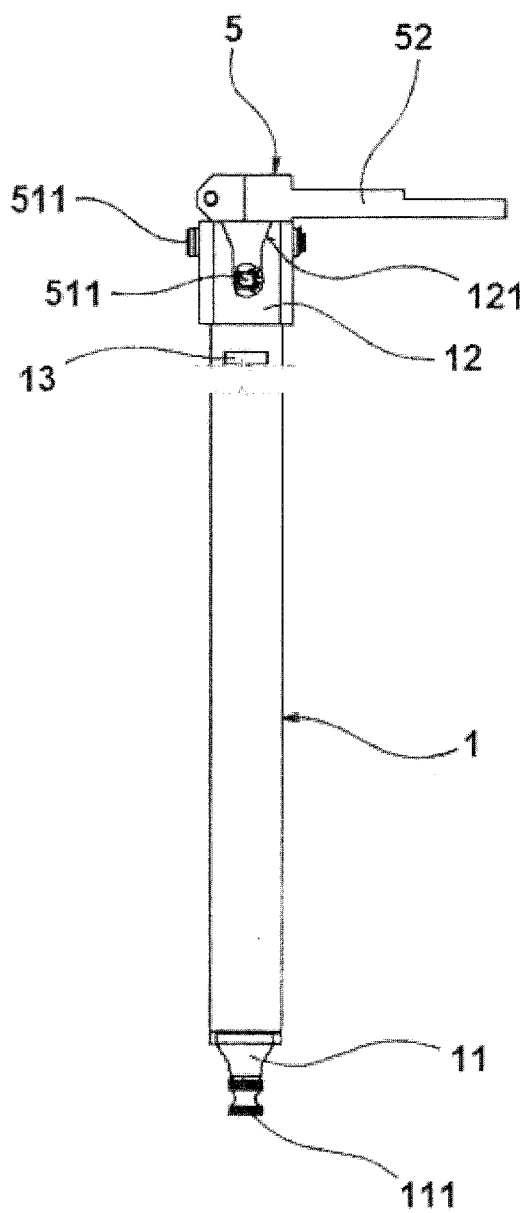

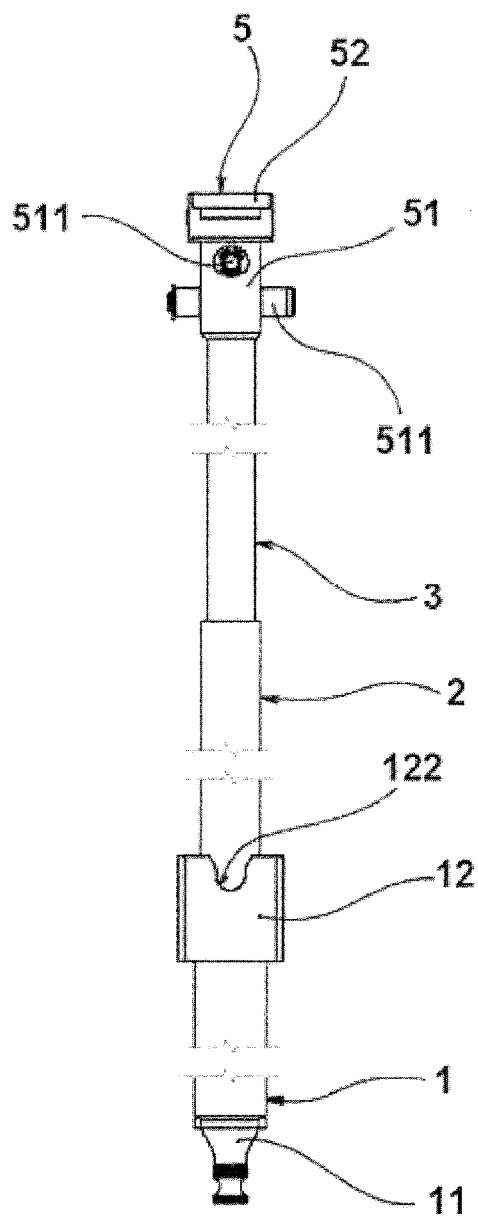
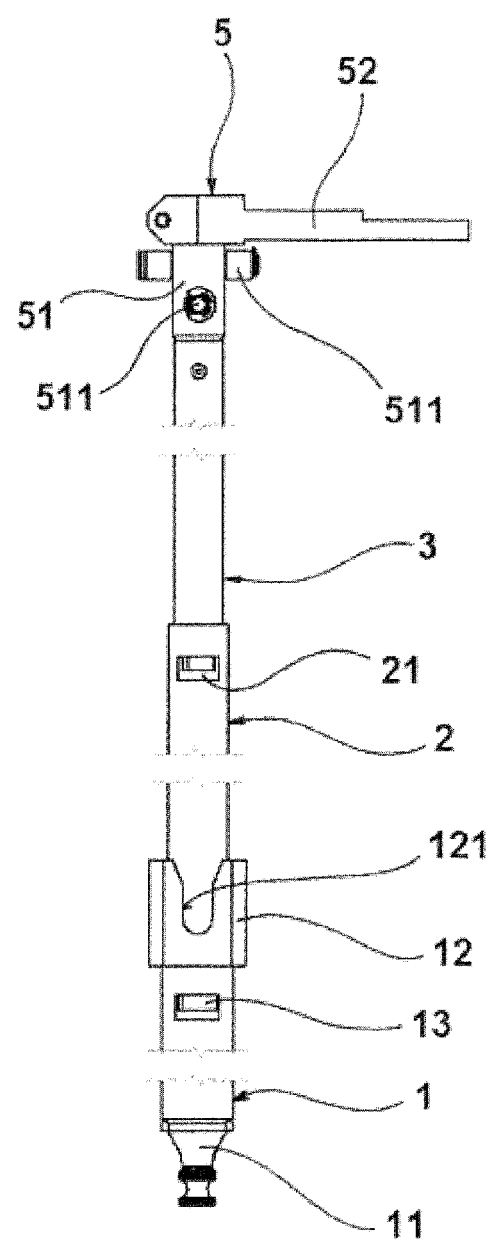
FIG. 5  FIG. 6

TELESCOPIC CONNECTING STEERING ROD

CROSS REFERENCE TO RELATED APPLICATION

The present application claims the benefit of Czech Application No. PV 2014-164, filed on Mar. 19, 2014. The entire contents of Czech Application No. PV 2014-164 are hereby incorporated herein by reference in their entirety.

FIELD OF THE INVENTION

The invention relates to design of a telescopic connecting steering rod, particularly for vehicles with necessity to assure tilting or shifting the steering control element (i.e. the steering wheel or handlebars) to enable the crew to disembark from the vehicle.

BACKGROUND OF THE INVENTION

Different built-ins enabling the tilting or shifting of the steering control element (e.g. the steering wheel or handlebars) are often used in vehicles requiring necessity to assure the crew can disembark from the vehicle (e.g. on the wheelchair). In a closed (i.e. pushed-in) state, the built-in tightly connects the steering system mechanics together. It is crucial to assure a correct position of both counterparts of the locking mechanism while tilting so that the parts are connected functionally to create a perfectly tight connection with zero lash when closing it repeatedly. The built-in also enables one to change a length ratio of a pulled-out state to a length of a pushed-in state to almost 3:1. The design also contains security elements that prevent individual components from being pulled out further than the designated range, which would disengage the guidance system thereby leading to loss of its proper function. The built-in also includes design elements on both ends, which enable it to be built in the steering system of the vehicle in a suitable way (e.g. a pivot serrated shaft, a lever with a possibility to mount a ball-joint of the steering gear box etc.).

According to the existing technology in the area of built-ins regarding connective elements of the vehicle steering systems many versions of telescopic steering rod designs are known, as it is evident e.g. from US20110005346, JP2010120558 and U.S. Pat. No. 4,572,023. These telescopic rods are used only to adjust the control steering element, most often a steering wheel, to a required position. These devices are, if they are to be functional in the entire range of their possible extension adjustment, demanding in terms of production, both technologically and financially. The above mentioned devices are adjustable mostly by a manual intervention of the operator and by setting it in the required position. Another device disclosed in JP2009107557 enables adjustment by means of an electric actuator. Although this version is more comfortable in terms of its operation, it is susceptible to occurrences of incorrect functioning due to malfunctions of electronics. U.S. Pat. No. 5,332,260 discloses a design of a device that enables adjustment by means of a gas spring, which allows fixing the steering system in the required position.

Further designs of joint shafts are disclosed in U.S. Pat. No. 6,035,740, EP0179711, GB1126071, CN201932226 and U.S. Pat. No. 4,384,861, which assure achieving an optimum adjustment of the steering system of the submitted device. However, these solutions do not enable reaching the required length ratio of the pulled-out state to the length of the pushed-in state to almost 3:1. These devices are also significantly demanding in terms of production and therefore are more costly. A similar application can be seen in the solution disclosed in WO2012060744, the steering rod extends in a requisite way and, moreover, tilts by means of a built-in joint when tilting the truck cabin. However, this steering rod does not reach the necessary range of extension. The required extension could be performed by a telescopic rod disclosed in US20060202463. The disadvantage of this telescopic rod is its demanding production due to used inner and outer toothed surfaces and cogwheels.

The telescopic connecting steering rod described herein aims to introduce a new, simple, designable version of the telescopic steering rod for vehicles, that eliminates shortcomings of known solutions, is functionally reliable, and which enables adjustment of the length between the pulled-out and the pushed-in state to almost 3:1.

SUMMARY OF THE INVENTION

The telescopic connecting steering rod, particularly for vehicle built-ins, includes a mutually telescopically arranged main steering rod, a middle adaptor, and an upper extension. A lower end of the main steering rod is adapted to enable its mounting in the vehicle steering system. An upper extension is fitted with a connecting element adopted to connect the steering rod to a tailgate part of the vehicle and to connect it to a control element of a vehicle steering mechanism. An above-open bushing on an upper end of the main steering rod and the connecting element include a head. An outline shape of the head conforms to an inner hollow of the bushing. These mutually insertable parts are fitted with fittings to connect the main steering rod and the connecting element with zero lash, such that the main steering rod, as well as the middle adaptor, are modified in their upper parts to hold the security elements, built in the lower parts of inner hollows of the middle adaptor and the upper extension, when the steering rod is fully extended.

An upper bushing front is fitted with two pairs of mutually perpendicularly arranged, unequally deep side grooves and front grooves. Below the level where the bushing is mounted, the main steering rod is provided with two lower, mutually oppositely cut cutouts that interlock a security element that is built in the lower part of the inner hollow of the middle adaptor, that is in its upper part provided with two mutually opposite, upper cutouts to interlock with the security element that is built in the lower part of the inner hollow of the upper extension. The connecting element includes a head fitted with two pairs of mutually perpendicularly arranged delimiting units led plumb to the longitudinal axis of the steering rod and mounted grade-separately so that the distance of their axes equals to the distance of the bottoms of the side grooves and front grooves of the bushing of the main steering rod, while the diameter of the delimiting units equals to the width of these grooves.

The security element is formed by two jaws, which are mutually coupled with a spacing spring and placed in a hollow shaft. It is fastened in the profile of the middle adaptor or of the upper extension by means of a connecting element going through the inside of the hollow shaft.

In an optimal design the delimiting units are shaped as rollers or wedges.

The telescopic connecting steering rod achieves a greater effect because while enabling a possible change of its length between the pulled-out and the pushed-in state to almost 3:1, perfect function is assured while disconnecting and re-connecting the steering system as a result of zero-lash connection of both parts. The solution includes a simple guidance mechanism formed by mutually telescopic profiles, which are in the closed state fully pushed in the main steering rod. Profiles of the guidance mechanism include security elements preventing against a full disengagement of profiles, which would cause destruction of the connecting rod.

BRIEF DESCRIPTION OF THE DRAWINGS

A concrete example of the invention is figured schematically on the attached drawings, wherein:

FIG. 1 is an axonometric view on the connecting steering rod in a pushed-in state, FIG. 2 is an axonometric view on the connecting steering rod in a pulled-out state, FIG. 3 is a side view on the connecting steering rod in a pushed-in state, FIG. 4 is a front view on the connecting steering rod in a pushed-in state, FIG. 5 is a side view on the connecting steering rod in a pulled-out state, FIG. 6 is a front view on the connecting steering rod in a pulled-out state.

Figure 7:
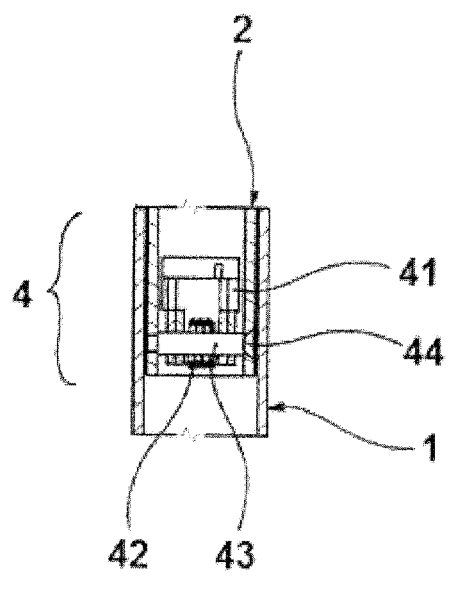
FIG. 7 is a partial vertical axial section through the connecting steering rod in the point of fitting the security element viewed from the side.

Drawings of the presented invention and the subsequently described example of a concrete design version do not limit the scope of protection specified in the definition whatsoever, but they are only to elucidate the nature of the invention.

DETAILED DESCRIPTION

As shown in FIGS. 1-6, a telescopic steering rod includes a mutually telescopically arranged main steering rod 1, a middle adaptor 2, and an upper extension 3. The main steering rod 1 is created by a hollow square profile and a lower end is adapted to enable its mounting in a vehicle steering system, e.g. it is fitted with a shaft 11 with a serration 111 to connect it with a cross joint (no shown). At the upper end of the main steering rod 1 a hollow above-open bushing 12 of a square cross-section is designed, an upper front of which has two pairs of mutually perpendicularly arranged, unequally deep side grooves 121 and front grooves 122 with half-round bottoms and guiding edges led slantwise to the center. Below the level where the bushing 12 is fastened, the main steering rod 1 is provided with two lower mutually oppositely cut through cutouts 13, situated under the side grooves 121, where their function is described below.

Figure 8:
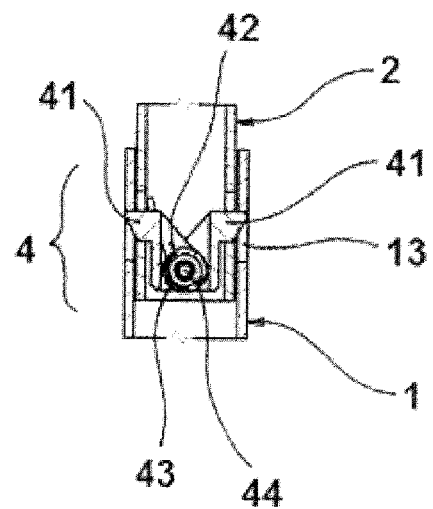
FIG. 8 is a partial vertical axial section through the connecting steering rod from the FIG. 7 viewed from the front.

The middle adaptor 2 is also formed by a hollow square profile and in an upper part of the middle adaptor 2, it is provided with upper cut through cutouts 21 situated vertically above the lower cutouts 13 of the main steering rod 1. In the lower part the middle adaptor 2 is mounted with a security element 4 (shown in FIGS. 7 and 8) built in the hollow of its profile. The security element 4 is formed by two jaws 41, which are mutually coupled with a spacing spring 42 and are placed in a hollow shaft 43. The security element 4 and it is fastened in the profile of the middle adaptor 2 by means of a connecting element 44, e.g. a countersunk screw going through a shaft hollow 43.

The upper extension 3, also of a square profile, is similarly to the middle adaptor 2 fitted with the same version of a security element 4 in a lower part of the profile hollow. A connecting element 5 is fastened, e.g. screwed to, to its upper end. The connecting element 5 consists of a square-profiled head 51 and a laterally led lever 52. The head 51 is situated concurrently to the longitudinal axes of the structural elements 1, 2, 3, and its outline shape conforms to an inner hollow of the bushing 12. The lever 52 is modified in its shape and function by means of elements not described further, to connect the steering rod to the tilting part of the vehicle unrepresented in figures, e.g. by means of an eye joint, and to connect it to a steering control element alike unrepresented in figures, e.g. steering rod or steering gear box, by which the rod is rotated around its axis. Furthermore, the head 51 is fitted with two pairs of mutually perpendicularly arranged delimiting units 511, e.g. rollers, led plumb to the longitudinal axis of the steering rod. The pair of delimiting units 511 is mounted grade-separately so that a distance of their axes equals a distance of the bottoms of the side grooves 121 and front grooves 122 of the bushing 12 of the main steering rod 1. A diameter of the delimiting units 511 then equals to a width of these side grooves 121 and front grooves 122.

In the working position, i.e. in a regular operation of the vehicle, the telescopic steering rod is in a pushed-in state, wherein the middle adaptor 2 and the upper extension 3 are pushed in the main steering rod 1, while the delimiting units 511 of the head 51 are pushed in both side grooves 121 and front grooves 122 of the bushing 12. In case tilting of the steering system is necessary, the middle adaptor 2 and the upper extension 3 are pulled out of the main steering rod 1 telescopically until the moment the jaws 41 of both security elements 4 interlock the lower cutouts 13 and upper cutouts 21, whereby the final position of pulling out the middle adaptor 2 and the upper extension 3 is set and therefore the maximum possible length of the steering rod is set. The process of pushing in the middle adaptor 2 and the upper extension 3 back into the main steering rod 1 is analogical, when smooth insertion of delimiting units 511 of the head 51 into the side grooves 121 and front grooves 122 of the bushing 12 is enabled by means of guiding edges of these side grooves 121 and front grooves 122 led slantwise to the center.

The above described version of the steering rod is not the only possible solution in accordance with the invention. Without affecting its nature, it is possible to use other standard structural elements to connect the rod with the steering system of a vehicle, with the tilting part of the vehicle or with the steering control element of the vehicle. The security elements 4 can likewise be solved by means of other backstops and positioning elements. The shape of the main steering rod 1, of the middle adaptor 2 and of the upper extension 3 is also not essential, where the square cross-section can be replaced by a rectangular or round shaped cross-section. Finally, it is possible to implement a zero-lash connection of the bushing 12 of the main steering rod 1 and the head 51 of the connecting element 5 in a pushed-in state of the connecting steering rod by means of other structural elements than rollers insertable to the grooves, e.g. by means of wedge connections.

INDUSTRIAL APPLICABILITY

The telescopic connecting steering rod according to the invention is designed for application in vehicle built-ins, where it is necessary to assure tilting or shifting the steering control element, i.e. the steering wheel or handlebars, to enable the crew to disembark from the vehicle.

I claim:
1. A telescopic connecting steering rod, comprising:
   a mutually telescopically arranged main steering rod having a lower end adapted to be mounted in a vehicle steering system;
   a middle adaptor;
   an upper extension fitted with a connecting element, the connecting element being adapted to connect the steering rod to a tailgate part of a vehicle and to a control element of a vehicle steering mechanism; and an above-open bushing disposed on an upper end of the main steering rod, wherein the connecting element includes a head, an outline shape of which conforms to an inner hollow of the bushing, the bushing and the connecting element are mutually insertable parts fitted with fittings to connect the main steering rod and the connecting element with zero lash, and the main steering rod and the middle adaptor are configured in their upper parts to hold security elements built in the lower parts of inner hollows of the middle adaptor and of the upper extension.

2. The telescopic connecting steering rod of claim 1, wherein a front of the upper bushing is fitted with two pairs of mutually perpendicularly arranged unequally deep side grooves and front grooves, below the level where the bushing is mounted, the main steering rod is provided with two mutually oppositely cut lower cutouts to interlock the security element built in the lower part of the inner hollow of the middle adaptor that is provided with two mutually opposite upper cutouts in the upper part to interlock a security element built in the lower part of the inner hollow of the upper extension, and the connecting element comprises a head fitted with two pairs of mutually perpendicularly arranged delimiting units led plumb to the longitudinal axis of the steering rod and mounted grade-separately so that the distance of their axes equals to the distance of the bottoms of the side grooves and front grooves of the bushing of the main steering rod, while the diameter of the delimiting units equals to the width of these side grooves and front grooves.

3. The telescopic connecting steering rod of claim 2, wherein the security element is formed by two jaws, which are mutually coupled with a spacing spring and placed in a hollow shaft, and is fastened in the profile of the middle adaptor or of the upper extension by means of a connecting element going through the hollow of the shaft.

4. The telescopic connecting steering rod of claim 2, wherein the delimiting units are shaped as rollers or wedges.

* * * * *